United States Patent
Mohri et al.

(10) Patent No.: US 8,170,032 B2
(45) Date of Patent: May 1, 2012

(54) METHOD AND ARRANGEMENT FOR EXTERNALLY CONTROLLING AND MANAGING AT LEAST ONE WLAN SUBSCRIBER WHO IS ASSIGNED TO A LOCAL RADIO NETWORK

(75) Inventors: Alexander Mohri, Mahlow (DE); Helge Vater, Stahnsdorf (DE); Michael Knuth, Oberkaemer (DE); Matthias Molzahn, Berlin (DE); Christoph Henkels, Frankfurt (DE)

(73) Assignee: Deutsche Telekom AG, Bonn (DE)

( * ) Notice: Subject to any disclaimer, the term of this patent is extended or adjusted under 35 U.S.C. 154(b) by 988 days.

(21) Appl. No.: 10/548,981

(22) PCT Filed: Feb. 12, 2004

(86) PCT No.: PCT/DE2004/000190
§ 371 (c)(1),
(2), (4) Date: Sep. 7, 2005

(87) PCT Pub. No.: WO2004/082209
PCT Pub. Date: Sep. 23, 2004

(65) Prior Publication Data
US 2006/0171382 A1    Aug. 3, 2006

(30) Foreign Application Priority Data

Mar. 10, 2003 (DE) .................................. 103 11 580
Sep. 23, 2003 (DE) .................................. 103 45 015

(51) Int. Cl.
*H04L 12/28* (2006.01)
*H04L 12/56* (2006.01)

(52) U.S. Cl. ................ 370/395.52; 370/262; 370/310.2; 370/328; 370/389; 370/901; 370/908; 455/92; 455/95

(58) Field of Classification Search .................. 370/262, 370/310.2, 328, 389, 392, 395.2, 901, 908; 455/92, 95
See application file for complete search history.

(56) References Cited

U.S. PATENT DOCUMENTS
6,130,892 A    10/2000  Short et al. .................. 370/401
(Continued)

FOREIGN PATENT DOCUMENTS
EP    1 331 754    7/2003
(Continued)

OTHER PUBLICATIONS

Patent Abstracts of Japan, entitled "Internet Access System", Publication No. 2003060651, published on Feb. 28. 2003 (see International Search Report for PCT/DE2004/000190).
(Continued)

*Primary Examiner* — Hassan Phillips
*Assistant Examiner* — Lonnie Sweet
(74) *Attorney, Agent, or Firm* — Leydig, Voit & Mayer, Ltd.

(57) ABSTRACT

A method for externally controlling and managing a wireless local area network subscriber assigned to at least one wireless local area network includes requesting a service using the subscriber, checking an authorization of the subscriber to access the TCP/IP network, and establishing a connection via the TCP/IP network to the subscriber if the subscriber has the authorization to access the TCP/IP network. Signaling and/or information data are managed using a control and managing device connected to the public TCP/IP network via an interface device.

22 Claims, 7 Drawing Sheets

U.S. PATENT DOCUMENTS

| | | | |
|---|---|---|---|
| 6,567,664 B1 * | 5/2003 | Bergenwall et al. | 455/435.1 |
| 6,600,734 B1 * | 7/2003 | Gernert et al. | 370/352 |
| 6,876,747 B1 * | 4/2005 | Faccin et al. | 380/247 |
| 7,042,988 B2 * | 5/2006 | Juitt et al. | 379/88.17 |
| 7,173,933 B1 * | 2/2007 | O'Rourke et al. | 370/389 |
| 7,206,593 B1 * | 4/2007 | Yarkosky et al. | 455/517 |
| 2002/0136226 A1 * | 9/2002 | Christoffel et al. | 370/401 |
| 2003/0041175 A2 | 2/2003 | Singhal et al. | 709/249 |
| 2003/0058827 A1 * | 3/2003 | Chow et al. | 370/338 |
| 2003/0139180 A1 * | 7/2003 | McIntosh et al. | 455/426 |
| 2003/0140256 A1 | 7/2003 | Hauenstein et al. | 713/201 |
| 2003/0157926 A1 * | 8/2003 | Ala-Laurila et al. | 455/406 |
| 2003/0185240 A1 * | 10/2003 | Vuong | 370/474 |
| 2004/0202120 A1 * | 10/2004 | Hanson | 370/328 |
| 2004/0202141 A1 * | 10/2004 | Sinivaara et al. | 370/338 |
| 2006/0004643 A1 * | 1/2006 | Stadelmann et al. | 705/34 |

FOREIGN PATENT DOCUMENTS

| | | |
|---|---|---|
| GB | 2 379 124 | 2/2003 |
| WO | WO 98/21676 | 5/1998 |
| WO | WO 01/76297 | 10/2001 |
| WO | WO 02/078256 | 10/2002 |
| WO | WO 03/015360 | 2/2003 |

OTHER PUBLICATIONS

Patent Abstract of Korea, entitled "Mobile Technique Real Time Service Information Subscriber", XP-002284654 (see International Search Report for PCT/DE2004/000190), May 11, 2002.

J. Ala-Laurila et al.: "Wireless LAN Access Network Architecture for Mobile Operatiors", IEEE Communications Magazine, Nov. 2001, XP-001107810, pp. 82-89 (see International Search Report for PCT/DE2004/000190).

International Search Report for PCT/DE2004/000190 (3 pages), Sep. 23, 2004.

* cited by examiner

METHOD AND ARRANGEMENT FOR EXTERNALLY CONTROLLING AND MANAGING AT LEAST ONE WLAN SUBSCRIBER WHO IS ASSIGNED TO A LOCAL RADIO NETWORK

CLAIM OF PRIORITY

This patent application is a national phase of International Application Serial No. PCT/DE2004/000190, filed Feb. 12, 2004, and claims the benefit of priority of German Application Serial Nos. DE 103 11 580.3, filed Mar. 10, 2003, and DE 103 45 015.7, filed Sep. 23, 2003, through the aforementioned International Application.

The invention relates to a method for externally controlling and managing at least one WLAN subscriber who is assigned to at least one wireless local area network (WLAN) and can request services via a public TCP/IP network. The invention also relates to an arrangement consisting of several communications networks, in particular, for carrying out said method, and it also relates to a control and managing device for use in a network arrangement of this type.

BACKGROUND

In the course of the rapid spread of wireless local area networks, called WLANs for short below, and their connection to the Internet, it is practical—similar to the situation with the public telephone network—to take measures so that system expansions and the integration of new performance features and services can be carried out simply, flexibly and quickly. The programming effort for the integration of new services should likewise be kept to a minimum.

SUMMARY OF THE INVENTION

According to the present invention, when a WLAN subscriber requests an Internet service, the appropriate connection and service control is carried out and managed by an external device.

The present invention provides a method for externally controlling and managing at least one WLAN subscriber who is assigned to at least one wireless local area network (WLAN) and can request services via a public TCP/IP network. At least one wireless local area network as well as an external control and managing device are connected to the public TCP/IP network via at least one interface means, also referred to as access cube below. The method comprises the following steps:
a WLAN subscriber requests a service;
the authorization of the service-requesting WLAN subscriber to access the TCP/IP network is checked;
a connection is established via the TCP/IP network to the WLAN subscriber if the WLAN subscriber has authorization to access the TCP/IP network; and
signaling and/or information data is transmitted via the TCP/IP network to the control and managing device, where it is managed.

At this point, it should be mentioned that the public TCP/IP network can be the Internet and a WLAN subscriber can be a terminal device such as, for example, a notebook or a personal computer with a WLAN card. The control and managing device can be a Nomads platform that should meet all of the requirements of a WLAN network. Services as defined by the invention are, for example, the voiceover IP service as well as all services available through the Internet service provider.

An advantageous feature of the invention is that the time-dependent and/or volume-dependent settlement data pertaining to a service-requesting WLAN subscriber is collected in the control and managing device in order to generate corresponding settlement data records. The settlement data records can then be stored as files and further processed.

Before a service-requesting WLAN subscriber is given access to the TCP/IP network, it is necessary to check whether the WLAN subscriber has an access authorization at all. This checking can first be carried out in an interface means that is associated with the wireless local area network in whose service area the WLAN subscriber is located. If the service-requesting WLAN subscriber has already been cleared by this interface means, then a connection of the WLAN subscriber to the service provider, also referred to specifically as the Internet Service Provider, is established via the public TCP/IP network. The control and managing device takes over the control and observation of the connection.

However, if the service-requesting WLAN subscriber has not yet been cleared by this interface means, then the following process steps are carried out:
at least one individual identification, especially the MAC (Medium Access Control) address and/or the IP address of the service-requesting WLAN subscriber, is transmitted to the external control and managing device;
in response to the individual identification, the external control and managing device checks whether the service-requesting WLAN subscriber has already been granted access authorization; and
a connection is established via the TCP/IP network if the WLAN subscriber has authorization to access the TCP/IP network. This procedure, in which the access authorization of a service-requesting WLAN subscriber is granted and managed centrally in the control and managing device, is also called authentication. This method allows a cleared WLAN subscriber to move among various interface means of the same wireless local area network or of another wireless local area network, which is also referred to as roaming, without a new authentication having to be carried out each time the WLAN subscriber changes to another interface means.

If the service-requesting WLAN subscriber is not registered in the interface means or in the control and managing device, that is to say, if no access authorization has yet been granted to this WLAN subscriber, then the subscriber is prompted to enter his/her authentication data. After the WLAN subscriber has entered his/her authentication data, he/she receives—possibly limited—authorization to access the TCP/IP network. As information data, the authentication data can contain the MAC address and the IP address of the WLAN subscriber.

In order to be able to discover, for example, cases of fraud, the authorization of the cleared WLAN subscriber is examined in the control and managing device. This, for example, checks whether the WLAN subscriber—in the case of a prepaid customer—still has a credit or is entitled to use the requested services at all. This functionality is also referred to in the description as fraud management.

At this point, it should be mentioned that a wireless local area network containing interface means and network access points is implemented in a so-called location, which can be a room or else a building. Together with the wireless local area network implemented there, a location forms a hotspot.

In order to be able to recognize an overload of the system, the capacity usage of at least one wireless local area network is ascertained and logged in the external control and managing device so that, as a function of the capacity usage, a service-requesting WLAN subscriber can be refused authorization to access the TCP/IP network, at least temporarily.

In order to be able to recognize the capacity usage of the wireless local area networks, the identification and/or the owner of at least some wireless local area networks and/or the address of the interface means associated with each wireless local area network are stored in the external control and managing device. Equivalent to the identification or the owner of a wireless local area network is the identification or owner of the location or of the hotspot in question where the wireless local area network is implemented. In addition, in the external control and managing device, a table is managed in which the identification and/or the owner of the wireless local area network and/or the address of the interface means associated with the wireless local area network at which the WLAN subscriber is currently logged on is assigned to each service-requesting WLAN subscriber to whom access authorization has been granted. This data can be managed in a means that is referred to in the detailed description as the WLAN inventory module.

In order to facilitate the first-time system log-on for a service-requesting WLAN subscriber, an individual website, for example, in the form of a user interface or a log-on form, can be stored in the external control and managing device for at least one wireless local area network and/or at least one WLAN subscriber and this website can be transmitted to a service-requesting WLAN subscriber.

In order to be able to generate precise settlement data records for a fee-based connection, it is necessary to know the payment modality of the service-requesting WLAN subscriber. For example, if it is a subscriber who has paid in advance for the use of services via the TCP/IP network (voucher), then before the subscriber is cleared, it is checked whether the service-requesting WLAN subscriber has a credit and, if so, an established connection is severed or no connection is established once the credit has been used up.

The present invention also provides an arrangement consisting of several communication networks according to the claim. For this purpose, the arrangement has at least one wireless local area network (WLAN) that is connected via at least one interface means to a public TCP/IP network, at least one WLAN subscriber and a control and managing device associated with the public TCP/IP network. The interface means and the control and managing device have means for exchanging signaling and/or information data via the public TCP/IP network, whereby the interface means and/or the control and managing device each have a checking means for checking the authorization of a service-requesting WLAN subscriber to access the public TCP/IP network. Moreover, the control and managing device has a means for controlling the establishment of a connection via the public TCP/IP network to the service-requesting WLAN subscriber, namely, contingent upon whether the WLAN subscriber has authorization to access the TCP/IP network.

The arrangement is characterized in that the signaling data contains settlement data and in that the control and managing device has a means for generating settlement data records on the basis of the settlement data as well as a means for forwarding the settlement data records to a settlement unit.

The arrangement is also characterized in that the interface means has a means for transmitting to the external control and managing device at least one individual identification, especially the MAC address and/or the IP address of a service-requesting WLAN subscriber, whereby, in response to the individual identification, the checking means of the control and managing device can check whether the service-requesting WLAN subscriber has already been granted access authorization.

Preferably, the control and managing device has a means for storing an individual website for at least one wireless local area network and/or for at least one WLAN subscriber as well as a means for transmitting a website to a service-requesting WLAN subscriber.

A means for checking the authorization of a service-requesting WLAN subscriber can be associated with the checking means of the control and managing device, for example, in order to carry out the fraud management explained in the description.

For this purpose, the control and managing device can have a means for storing the identification and/or the owner of a wireless local area network and/or the address of the interface means associated with the wireless local area network. Moreover, it can contain a means for managing a table in which the identification and/or the owner of the wireless local area network and/or the address of the interface means associated with the wireless local area network at which the WLAN subscriber is currently logged on is assigned to each service-requesting WLAN subscriber to whom access authorization has been granted.

Moreover, the control and managing device can have a means for ascertaining the capacity usage of at least one wireless local area network and a blocking means that, as a function of the capacity usage, can refuse to grant authorization to a service-requesting WLAN subscriber to access the TCP/IP network.

In order to be able to generate precise settlement data records, the control and managing device has a means for determining the payment modality of a service-requesting WLAN subscriber.

In order to be able to quickly make changes to the arrangement, for example, by connecting another wireless local area network, to offer new services without much effort, and to improve the security of the arrangement, the control and managing device is configured as a computer network. The means or functionalities of the control and managing device, which are realized by hardware and/or software components, are distributed among certain computers of the computer network.

At this point, it should be mentioned that the term "module" is often used in the description for the terms computer, means or functionality.

According to a preferred embodiment, the arrangement comprises at least a first computer, also called the kernel module in the description, in which the checking means, the means for generating settlement data records, the means for ascertaining the capacity usage of at least one wireless local area network, the blocking means and the means for determining the payment modality are all implemented. Moreover, at least a second computer, also called a view module in the description, is provided in which the means for storing individual websites and the means for transmitting a website to a service-requesting WLAN subscriber are implemented, and at least a third computer, also called BSS (business support service) module below, is provided in which, among other things, the settlement unit is implemented.

The control and managing device can have means for observing and managing the computers and the distribution of the means or functionalities of the control and managing device among the computers. In the detailed description, this means is referred to as an NDF (Nomads distribution functionality) module. In this context, also see FIG. 5.

The present invention also provides a control and managing device that is suitable for use in an arrangement consisting of several communication networks as described above.

BRIEF DESCRIPTION OF THE DRAWINGS

The invention will be explained in greater detail with reference to an embodiment in conjunction with the accompanying drawings. The following is shown.

DETAILED DESCRIPTION

Figure 1:
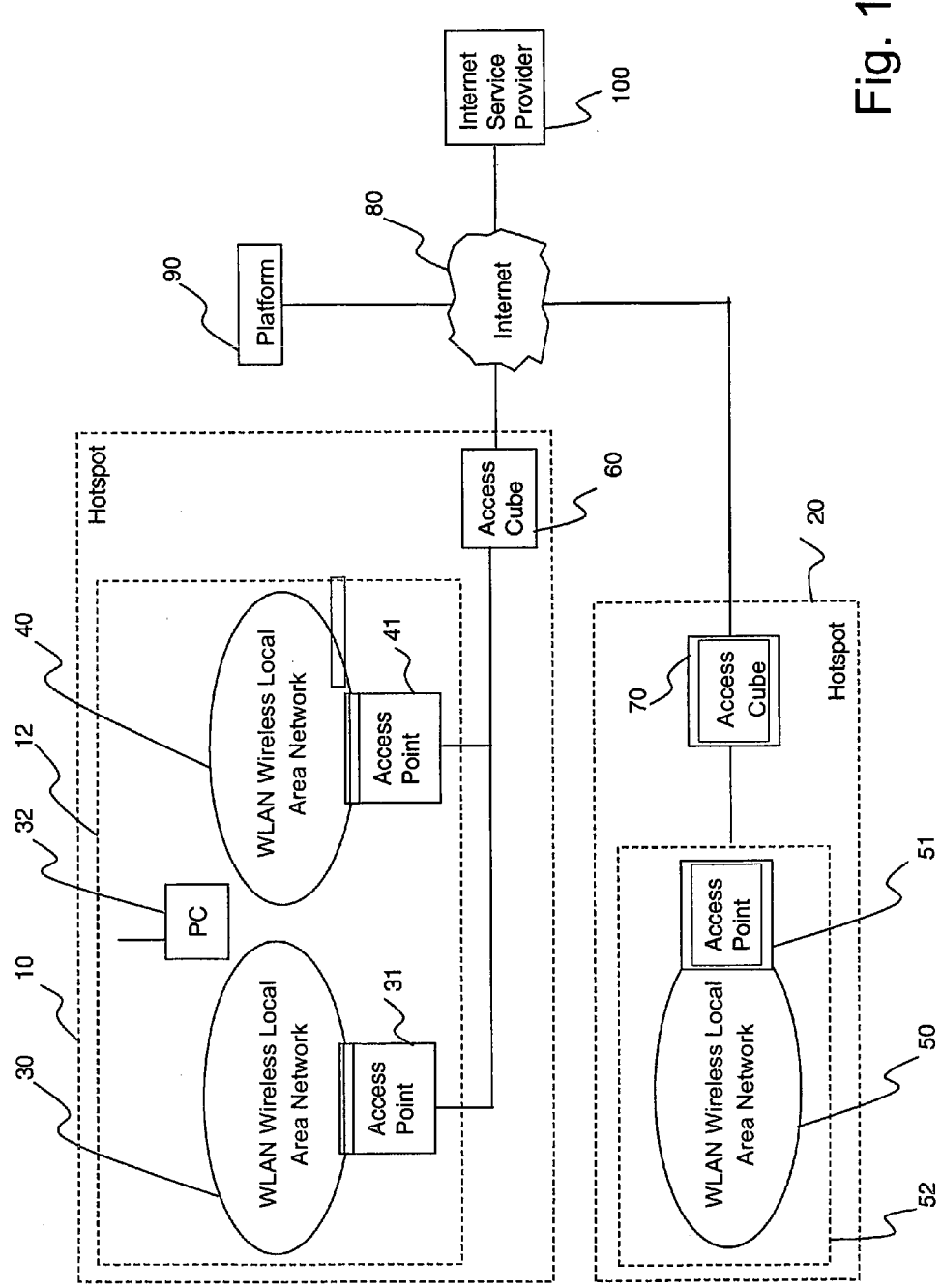
FIG. 1 a schematic depiction of an arrangement consisting of two wireless local area networks and the Internet, in which the invention is realized, FIG. 2 a simplified depiction of the control and managing device shown in FIG. 1, FIG. 3 a detailed view of the kernel module of the control and managing device shown in FIG. 2, FIG. 4 a block diagram of the BSS module shown in FIG. 2, FIG. 5 a schematic depiction of the NFD module, FIG. 6 the signaling and/or information sequence between the WLAN subscriber, the access cube and the control and managing device, and FIG. 7 the information flow within the control and managing device.

FIG. 1 shows an example of the network arrangement in which the invention is realized. The network arrangement has a first wireless local area network 12, which is also referred to as WLAN (wireless local area network). The WLAN 12 has two access points 31 and 41, which each serve a WLAN wireless area 30 and 40 respectively. The access points 31 and 41 are connected to a WLAN-Internet interface 60 which will be referred to as access cube or Nomads access cube below. Via the access cube 60, the WLAN 12 can be connected to a public TCP/IP network, in the present case, the Internet 80. Within the WLAN 12, there is a WLAN subscriber 32, which is, for example, a notebook with a WLAN card. The WLAN 12, the access points 31 and 41 and the access cube 60 form a so-called hotspot 10 or a so-called location, which can be, for example, a hotel. In this case, the access points 31 and 41 can be arranged in various rooms of the hotel.

Another wireless local area network 52 comprises an access point 51 and the associated WLAN wireless area 50. The access point 51 is connected to a WLAN-Internet interface 70, also called access cube. Via the access cube 70, the WLAN 52 can be connected to the Internet 80. The WLAN 52 and the access cube 70 form a hotspot 20 or a location 20. The hotspot 20 can be a restaurant. A control and managing network 90, also referred to below as a Nomads platform, is associated with the Internet 80. By way of an example, FIG. 1 shows an Internet service provider 100 whose services can be requested via the Internet 80, for example, by the user of the notebook 32, with the assistance of the Nomads platform 90.

The access cubes 60 and 70 exist in two different versions. One variant functions here as a transparent bridge, that is to say, it is classified in the plane 2 according to the seven-layer model or according to the DOD model. It can also be referred to as an L2 (Layer 2) access cube. This version can be the standard component if further-reaching requirements exist with respect to the management of WLAN users. Moreover, there is also an IP-based access cube that, for this reason, is also referred to as an L3 (Layer 3) access cube.

The L2 version of the access cubes 60 and 70 functions on the level of Layer 2 in terms of the control of the connection. This has a number of consequences for the architecture in the implemented network infrastructures:

If the access cube functions as a transparent bridge, the actual connection between a WLAN subscriber and the called service will not consider this access cube on the IP level.

Provided that the employed MAC addresses cannot be changed in the WLAN card of the WLAN subscriber 32, storing the MAC address in the platform 90 makes it possible to track the movement of the WLAN subscriber 32—even in case of movement in the local or free-of-charge content area of the platform 90. Many fraud detection mechanisms are based on the storage of this data.

Nomads stands for a platform that, like a GSM network or other network structures such as an intelligent network, is supposed to cover all requirements for the WLAN area. WLAN hotspot systems are offered by various manufacturers. The availability of these products means that their distribution can be anticipated in various price categories, so that a WLAN hotspot operator can select the appropriate technology on the basis of certain cost-benefit aspects. The Nomads platform 90 supports all WLAN manufacturers since in the background, it connects, for example, the hotspots 10 and 20 via a TCP/IP network. This integration is realized by a decentralized component that, in each case, is set up at the place of the WLAN hotspots 10 and 20, where the transition is made to the public TCP/IP network 80.

The decentralized Nomads component comprises the access cubes 60 and 70. The access cubes 60 and 70 provide the necessary data so that the requirements from the WLAN wireless areas 30, 40 and 50 can be realized on the Nomads platform 90. As FIG. 1 shows, the access cubes 60 and 70 are connected via the public TCP/IP network 80 to the Nomads platform 90. This connection can be secured by various encryption methods so that the exchange of information between the access cubes 60 and 70 and the central Nomads platform 90 is secured. Encryption technologies that can be used include, for example, SSL (secure socket layer), VPN (virtual private network) or IPSec technology.

For purposes of a better understanding or for a delineation vis-à-vis other architectures, it should be mentioned at this point that the communication path of active data, that is to say, the actual information, between the WLAN subscriber 32 and the appertaining service provider 100, leads directly via the Internet 80, whereas signaling data between the Nomads access cubes 60 and 70 and the Nomads platform 90 is exchanged via the Internet 80.

Figure 2:
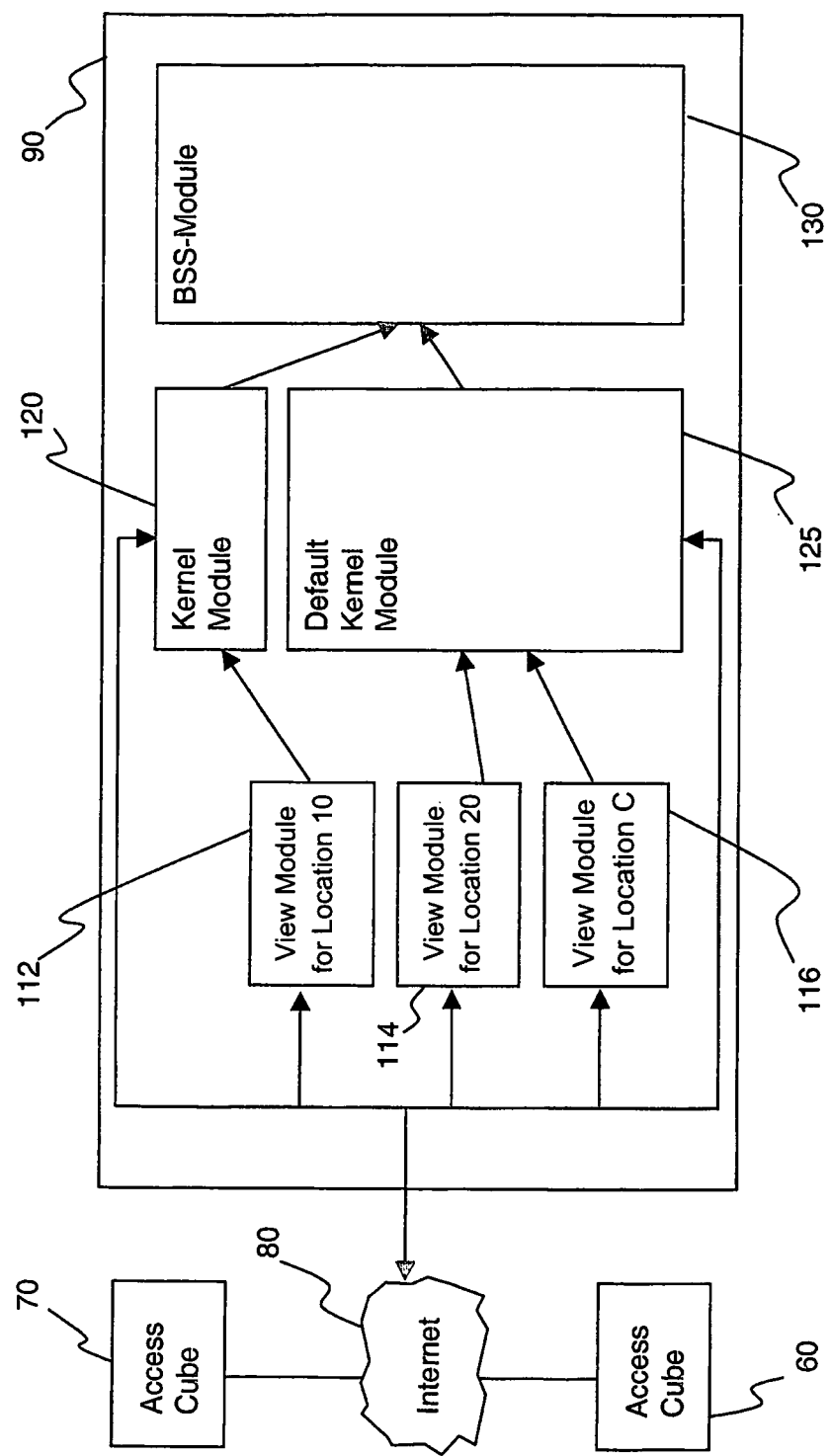

The Nomads platform 90 is depicted schematically in FIG. 2 and it consists of three layers that are referred to as view modules 112, 114, 116, kernel module 120, default kernel module 125 and business support services module 130. The three layers can contain any desired number of modules, thus forming a structured network.

All requests pertaining to a surface (information about the system, reference to local content, capabilities for the end user or operator to input information) are implemented in the view modules 112, 114, 116. In addition, in each view module, a log-on functionality can be implemented that can be made available to a WLAN subscriber for logging on to an access cube and/or to the platform 90. Moreover, all available providers (for example, vWISP—virtual Wireless Internet Service Provide—WISP, GSM provider, etc.) can be stored in each view module. Voucher generation for a service-requesting WLAN subscriber is also possible in a view module.

Preferably, an individualized Look & Feel in the form of a homepage can be stored in the view module 112, in the view module 114 or in the view module 116 for each location; in the present case, these are the locations or hotspots 10 and 20 as well as the location C (not shown in FIG. 1). Here, it should be pointed out that a separate view module—designated as 112, 114, 116 in FIG. 2—can be established for each location. As an alternative, all locations 10, 20 and C can be implemented in one single view module. The location identification, the address of the appertaining access cubes, the MAC address and/or the IP address of the WLAN subscriber who is logged on at the appertaining access cube as well as surface elements for generating an individual, location-related website can all be stored in the view modules. It is also conceivable to divide a location, for example, location 10, into sub-locations (e.g. rooms in a hotel), the address of each sub-location being likewise stored in the appertaining view module.

Essentially, the settlement data is gathered in the kernel module 120 and this data can be acquired by metering or accounting. This data is compressed to the greatest extent possible or else it is made available to the subsequent business support services (BSS) module 130. The collected data—irrespective of whether it is present as individual data or as aggregated data—is collected in files and made available to the appertaining BSS module 130 via file transfer functionalities of the SOAP protocol.

All of the requests to the platform 90 which result from the implementation of the value-added chain as well as from the data collection in the decentralized access cubes 60 and 70 are implemented in the BSS module 130.

In this context, the layer model allows the specific adaptation of the platform 90 to the requirements of the locations or the support of the boundary conditions prescribed there. As FIG. 2 indicates, this flexibility is supported by the modular system Nomads. The various locations 10, 20 and C (not shown in FIG. 1) are each connected to an individual view module 112, 114 or 116, where the "personal" Look & Feel can be reproduced. View modules that are associated with highly available locations or locations with a high WLAN load such as, for example, location 10, are each connected to their own kernel module. In the present example, the view module 112 is connected to the kernel module 120. Other view modules, in which locations with moderate or low loads are implemented, are connected to a standard or default kernel module. In the present example, the view modules 114 and 116 are connected to the default kernel module 125. The kernel module 120 and the default kernel module 125 recognize the individual locations and forward the appertaining information to the BSS module 130.

Figure 5:
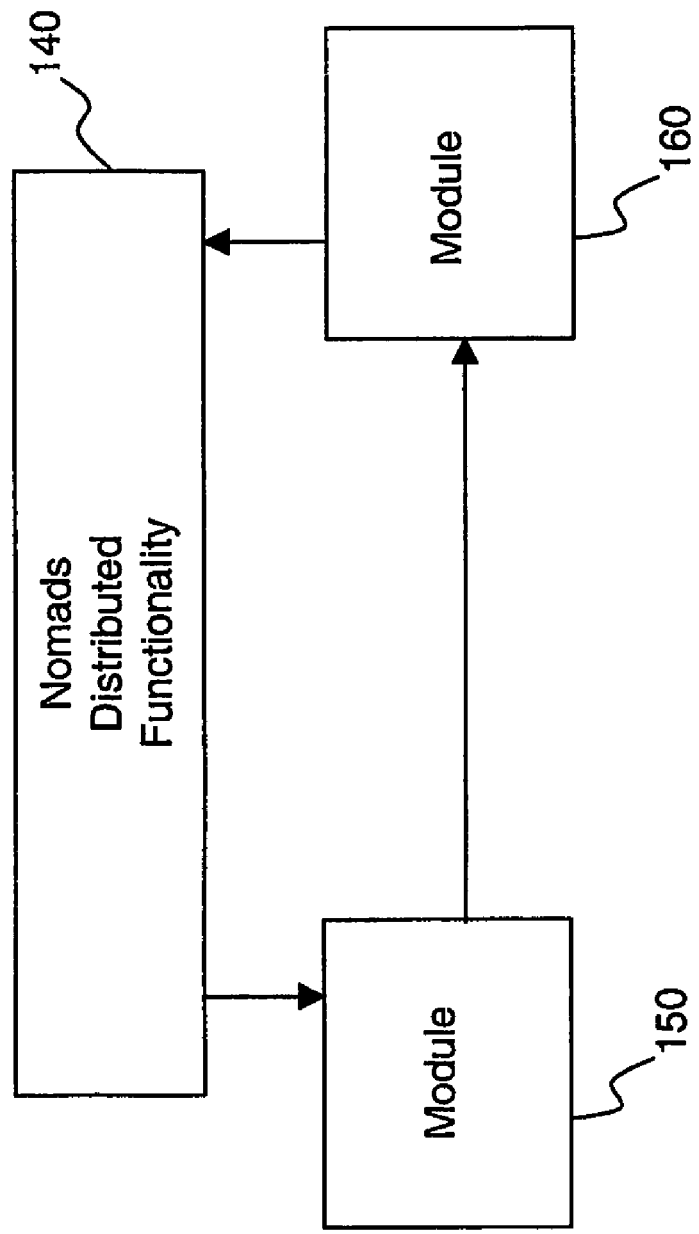

The Nomads platform 90 also makes it possible to distribute functionalities over several, physically separate modules or computers, as is shown in FIG. 5. For the technical implementation of the distribution, a so-called Nomads distribution functionality 140 (NDF) is used that can provide the following functions:

Flexible distribution of the components among various computers beyond cluster and network boundaries. The components can comprise hardware and software components.

Possible fallback scenarios in case of the failure of central components such as, for example, kernel modules or BSS modules. In FIG. 5, for instance, two modules 150 and 160 are shown in which the same or different functionalities can be implemented.

The network services of the NDF offer essentially a type of specialized directory service that establishes the association between the modules, that defines possible specialized alternative modules and that should also take over the routing. For the latter case, especially web service routing should be used.

Let it be assumed that the module 160 offers a certain service. This service is entered in the NDF 140. When the module 150 needs this service, it requests this service (resolve) and binds itself to the service upon receiving the reference (bind). This cycle is also offered in this way in other frameworks (JINI), but it is sometimes referred to differently there.

Below, by way of an example, the communication relationships between the access cube 60 and the platform 90 are explained in conjunction with FIG. 6.

In principle, the following signaling and information data is to be exchanged between an access cube, for example, the access cube 60, and the Nomads platform 90 or else the following mechanisms are to be implemented:

In case of an initial access by the WLAN subscriber 32 via the access cube 60 to the Internet 80, a request has to be sent to the platform 90 so that the following services can be realized:

Authentication, especially for setting up a WLAN subscriber in the Nomads platform 90. It is determined which personalized data and non-personalized data (voucher) can be used for a fee-based connection for settlement purposes.

Authorization, that is to say, the acceptance regarding the WLAN use, is checked. Moreover, it is checked whether the service-requesting WLAN subscriber can be cleared for the requested service.

After the WLAN subscriber has been cleared, an "observation unit" is activated in the platform 90 in order to collect settlement data from the access cube at which the WLAN subscriber has logged on.

Blocking of specific WLAN subscribers or terminal devices on the basis of instructions by operators or other institutions through the platform 90.

Figure 6:
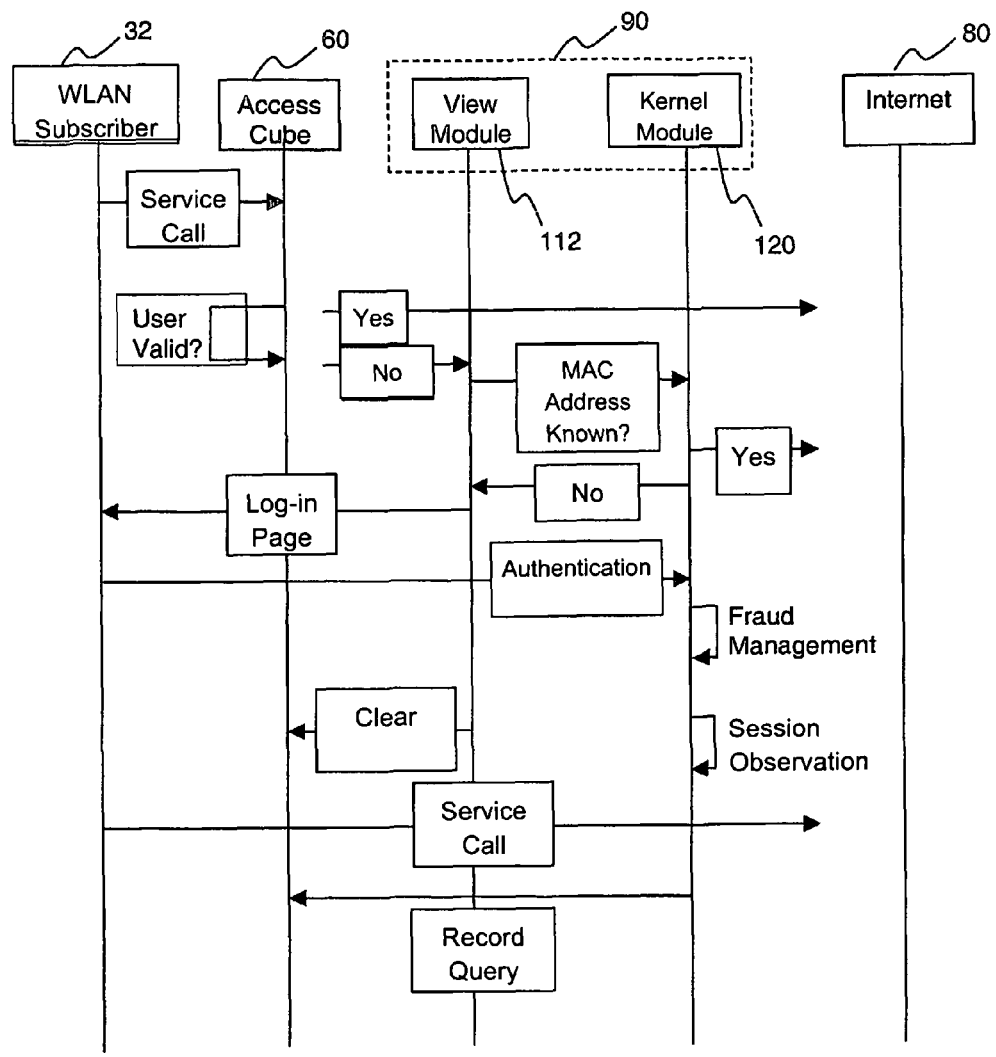

FIG. 6 shows the WLAN subscriber 32, the access cube 60 of the hotspot 10, the view module 112 and the kernel module 10 of the platform 90. The "Internet access" block serves to symbolize access to the Internet 80. The modules will be listed below.

Figure 3:
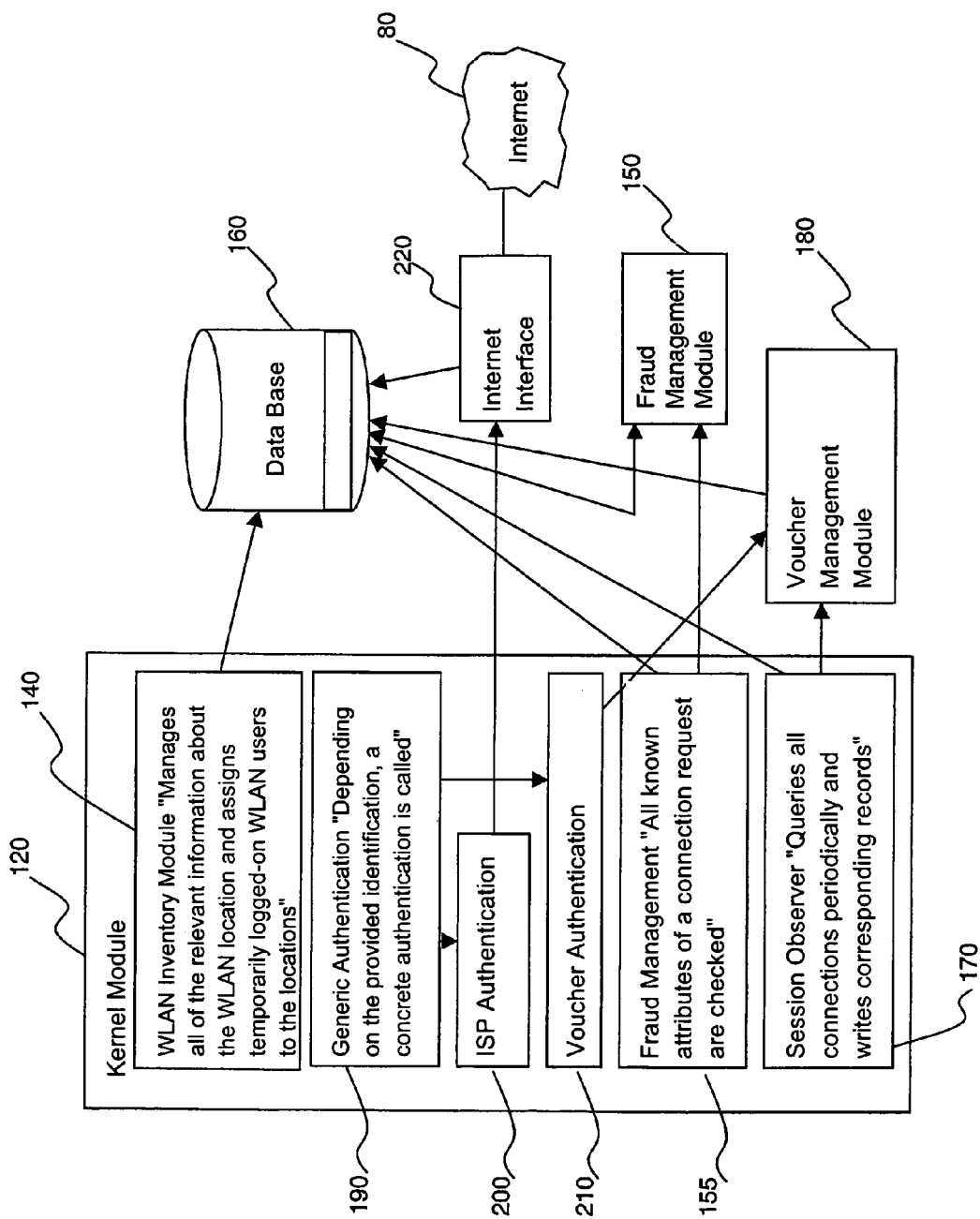

Every time the WLAN subscriber 32 accesses the public TCP/IP network 80, here the Internet, a checking procedure is carried out in the access cube 60 (user valid?) to ascertain whether the WLAN subscriber 32 can be connected through to the Internet 80. If this is the first time that the user of the WLAN subscriber 32 is requesting access to the Internet 80 via the access cube 60, then the WLAN subscriber 32 is unknown there so that access at the access cube 60 is refused. According to a standard procedure, the WLAN subscriber 32 is connected via the Internet 80, for example, to the view module 112, and a request signal (request), which can contain the MAC address and/or the IP address of the user 32, is transmitted to the view module 112. The view module 112 forwards the MAC address of the WLAN subscriber 32 contained in the request to the kernel module 120, especially to a WLAN inventory module 140, as is shown in FIG. 3. If the WLAN inventory module 140 ascertains that the WLAN subscriber or the subscriber's MAC address is not known, then said WLAN inventory module 140 instructs the view module 112 to transmit to the WLAN subscriber 32 a log-in page stored for the location 10. This page gives the WLAN subscriber 32 the possibility to authenticate himself/herself in different ways at the access cube 60 and the platform 90. For the authentication of the WLAN subscriber 32, in principle, the following authentication data can be used:

WISP account

VWISP account
ISP account
credit card
telephone number
MAC address of the WLAN subscriber
IP address of the WLAN subscriber The authentication data is then transmitted via the access cube 60, the Internet 80 and the view module 112 to the WLAN inventory module 140 of the kernel module 120.

The WLAN inventory module 140 forms, among other things, the basis for the roaming of a WLAN subscriber among various access cube areas that are made up of, for example, the hotspots 10 and 20. For example, the information that the WLAN subscriber 32 with the MAC address m is entered in the access cube 70 of the location 20 and would now like to log on at the access cube 60 of the location 10 could be the basis for the roaming. As soon as the WLAN subscriber 32 has been logged on once at an access cube, the appertaining authentication data is registered in the kernel module 120, preferably in the WLAN inventory module 140, as well as in the access cube in question. Since in the above-mentioned case, the authentication data of the WLAN subscriber 32 is registered in the kernel module 120, there is no need for a renewed log-on or authentication at the access cube 60. Depending on the set-up of the infrastructure, the positive identification of the WLAN subscriber 32 can result in the latter being cleared to use the Internet. In other words, the Nomads platform 90 makes it possible for the WLAN subscriber 32 to move from one hotspot to another hotspot, without having to log on at the platform 90 or at an access cube each time said WLAN subscriber moves to a new hotspot.

By means of the WLAN inventory module 140, roaming over several access cube areas can also be supported if a hotspot is achieved through the set-up of several access cubes, or if the geographic boundaries of several hotspots overlap. In these cases as well, a WLAN subscriber does not have to be authenticated once again. After the first successful log-on, the subscriber is registered in the platform 90 as an authorized WLAN subscriber.

The WLAN inventory module 140, as is shown in FIG. 3, is connected to the memory 160, which can store location information or information about the location owner. Thus, the memory 160 contains information as to which location belongs to which location owner. Via an input port, the location information is supplied to the WLAN inventory module 140, so that this information is likewise available when the WLAN inventory module 140 is called. It should be mentioned that the WLAN inventory module 140, as shown in FIG. 3, is part of the kernel module 120. However, it can also be implemented separately from it.

Once the authentication of the WLAN subscriber 32 has been carried out successfully, then a fraud management 155 in a fraud management module 150 is called, as is shown in FIGS. 3 and 6. The fraud management determines through appropriate feature lists whether certain users or WLAN subscribers, in the present case the WLAN subscriber 32, should be blocked. When a critical feature of a user who has just logged in is found, the Internet access of the WLAN subscriber is blocked. If no suspicious features are found, the user is cleared and can now access services, for example, of the service provider 100, via the Internet 90. These features can be entries of service providers indicating that certain users still have unpaid invoices. Consequently, the fraud management should achieve at least the two following objectives:

setting attributes or attribute volumes (filters) that should be checked on the basis of black lists during a connection initialization.

checking the logged-on WLAN subscribers by reading out available information about the WLAN subscribers from the WLAN inventory module 140 and compared to the set attributes.

During the period of time that the service is being used, the WLAN subscriber 32 is observed by suitable mechanisms and connection-related data and/or WLAN subscriber-related data is written as a file into a memory 160, as shown, for example, in FIG. 3.

For this purpose, a session observation device 170 shown in FIG. 3, also called a session observer, is used. The session observation device 170 observes the connection made by the WLAN subscriber 32 via the Internet 80 to a service provider, for example, the service provider 100. The session observation device 170 has to recognize on the basis of the received data whether the WLAN subscriber 32 is, for example, a voucher, for which the costs being incurred are covered by prepaid cards. For this purpose, the session observation device 170 is connected to a voucher management module 180 which, in turn, can be connected to the memory 160, as shown in FIG. 3. If the WLAN subscriber 32 is a voucher, then settlement-related signaling data, which is generated by the access cube 60 at which the WLAN subscriber 32 is currently logged on, causes corresponding settlement data records, also referred to as CDR (CALL detail record), to be stored in the kernel module 120 and to be transmitted as files to the voucher management module 180.

The view module in which currently logged-on WLAN subscribers are registered causes the voucher management module 180 to initiate an individual generation of a voucher or a mass generation of vouchers. The vouchers are stored here with the following attributes (by way of example):
VoucherID
VoucherPassword
VoucherValue
VoucherTime Here, it is immaterial whether the vouchers are generated by administrative personnel and sold by marketing/sales staff on site or whether a voucher is generated on a personalized basis. With both approaches, the authentication procedure of a WLAN subscriber is initiated by the voucher values VoucherID and VoucherPassword, whereby the kernel module 120 then registers the presales nature of the connection established for the WLAN subscriber. Hence, the kernel module 120 not only can generate the CDR data records of the connection, but it also establishes contact with the voucher management module 180 and minimizes the available time allotment of each particular WLAN subscriber. As soon as the credit of a WLAN subscriber has been used up, the kernel module 120 breaks the connection via the Internet 80 using the fraud management module 150.

In a personalized procedure, the vouchers are associated with a specific person, that is to say, the credit of a voucher is credited to a person. As a result of this procedure, the credit of a voucher is immediately set to zero and the user is "filled up" with this credit.

In order to carry out the authentication, the MAC address as well as the IP address of the WLAN subscriber 32 can be entered in the WLAN inventory module 140. The availability of this information depends on the access cube technology used. As FIG. 3 shows, the WLAN inventory module 140 administers all of the relevant information about locations, such as the locations 10 and 20, and assigns temporarily logged-on WLAN subscribers to the appropriate locations. If the WLAN subscriber 32 is currently logged on at the access cube 60, then it is assigned to the location 10 in the WLAN inventory. All of this information is stored in the memory 160.

As shown in FIG. 3, the authentication carried out in the kernel module 120 comprises a so-called generic authentication in block 190, in which the received data is checked as to whether the data belongs to a voucher subscriber or to a service provider. Depending on the result of the checking procedure, either an ISP (Internet Service Provider) authentication is carried out in block 200 or a voucher authentication is carried out in block 210. Block 200 is connected via an Internet interface means 220 to the Internet 80. Block 210 is connected to the voucher management module 180.

As FIG. 3 shows, the function blocks 155, 170, 190, 200, 210 and the WLAN inventory module are implemented in the kernel module 120. The memory 160, the Internet interface 220, the fraud management module 150 and the voucher management module 180 are depicted outside of the kernel module 120. It goes without saying that the depicted arrangement is merely an example. Of course, components of the kernel module 120 can be arranged externally and the described components 150, 160 180 or 220 can be implemented within the kernel module 120.

Figure 4:
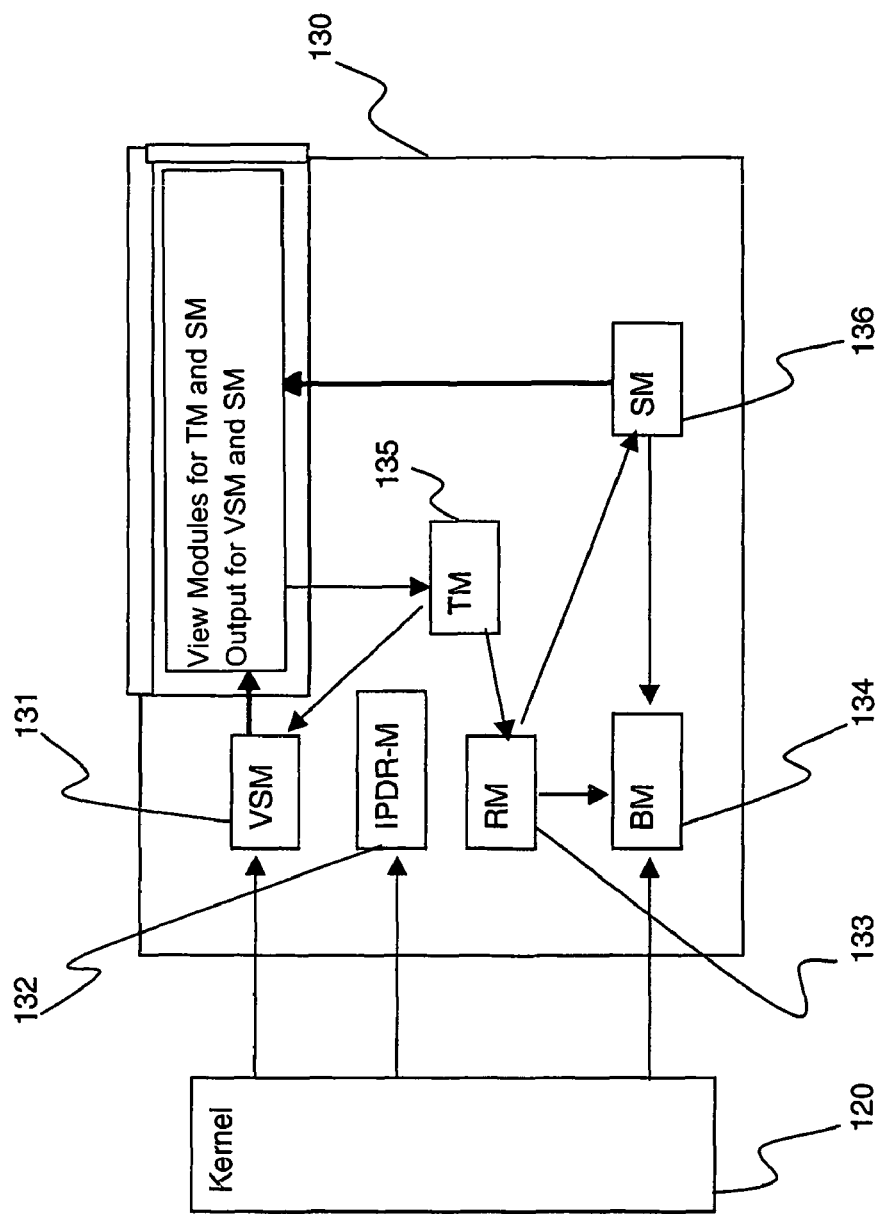

The BSS module 130 is depicted in greater detail in FIG. 4. The following properties preferably characterize the BSS module 130:
  The BSS module is built upon data structures that are supplied by the kernel module 120 and/or 125.
  The BSS module has no direct connection to the kernel module 120 and/or 125; only a loose coupling on the level of CDR files exists.

In addition to a voucher settlement module (VSM) 131, the BSS module 130 comprises an IPDR mediator (IPDR-M) 132, a tariff module (TM) 135, a rating module (RM) 133, a billing module (BM) 134 and a settlement module (SM) 136.

The kernel module 120 generates, for example, credit settlement data records, also called voucher CDRs, having the following parameters:
  access cube ID
  voucher identification (this CDR belongs to a prepaid modality)
  time stamp (start and end)
  tariff information (price per unit of time)
  volume information On the basis of this information, the voucher settlement module 131 can carry out the following processing steps, for example, by accessing the database 160 of the platform 90:
  Association of the access cube ID with a location
  Association of the location with revenue-share participants or revenue-share In a first processing step, the sum of the connections per location or hotspot is calculated on the basis of the individual CDRs. This sum or the sales is obtained from the period of time multiplied by the tariff information. Through the information of the revenue-shares of the participants, the individual revenue-shares can be calculated and these data records can be stored as revenue-share records (RSR).

The IPDR mediator 132 uses the CDRs that do not have the identification voucher to generate IPDR data records according to the NDM-U standard of the non-profit organization IPDR.org.

The tariff module 135 contains all of the information that results from the different tariffs of the appertaining locations. Likewise, the different customer groups are to be observed. The details result from the individual project requests. In essence, a generic model is implemented that can cover most requests.

The rating module 133 is likewise implemented generically so that the appertaining requests of the participants can be implemented. The rating module 133 uses the CDRs to generate weighted, so-called R-CDRs.

The billing or settlement module 134 makes use, for instance, of the settlement functionality of T-COM. All of the R-CDRs generated by the rating module 133 are forwarded via a file interface, for example, to the settlement system of T-COM. Here, the following business steps are implemented:
  generating the invoice
  printing the invoice according to a predefined format (Look & Feel, for example, of vWISP)
  transmitting the payment control to the FIBU
  reminder system In parallel to the billing module 134, the R-CDRs generated by the rating module 133 are forwarded to the settlement module 136, which has the following information:
  knowledge about the participants in a defined value-added chain or knowledge about the percentage breakdown of the sales
  mapping information about locations on the possible revenue-share models.

With this knowledge, the R-CDRs can be calculated per location and assigned to the participants.

Figure 7:
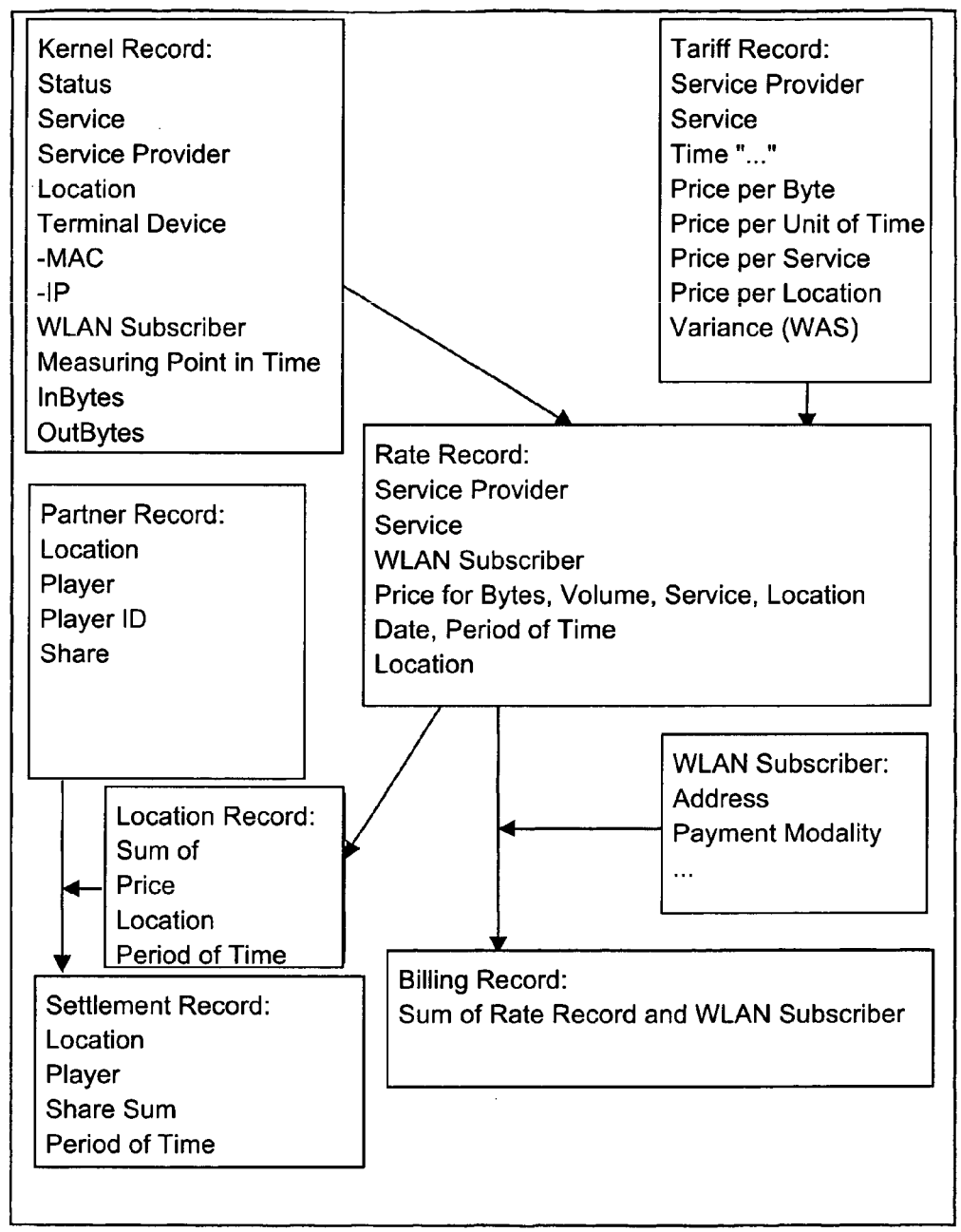

FIG. 7 shows which data is managed in which modules and which data is exchanged between which modules.

The invention claimed is:

1. A method for externally controlling and managing at least one wireless local area network subscriber assigned to at least one wireless local area network and capable of requesting services via a public TCP/IP network, the method comprising:
  receiving a service request through a first wireless local area network of a plurality of wireless local area networks from a wireless local area network subscriber;
  checking an authentication of the subscriber to access the TCP/IP network;
  establishing a connection through the first wireless network between the TCP/IP network and the subscriber if the subscriber has an authorization to access the TCP/IP network;
  transmitting at least one of signaling and information data via the TCP/IP network to a control and managing device connected to the TCP/IP network, wherein the control and managing device is external to a service provider associated with the at least one wireless local area network and to the plurality of wireless local area networks;
  registering, at the control and managing device, the authorization to access the TCP/IP network for the subscriber;
  permitting the wireless local area network subscriber to move from the first wireless local area network to a second wireless local area network, free of the checking step, using the authorization to access the TCP/IP network for the subscriber registered at the control and managing device;
  monitoring, at the control and managing device, usages of the plurality of the wireless local area networks as the subscriber moves from the first to the second wireless local area network; and
  ascertaining and logging, in the external control and managing device, a capacity usage of the first wireless local area network so as to enable, as a function of the capacity usage, the subscriber to be denied, at least temporarily, the authorization to access the TCP/IP network.

2. The method as recited in claim 1 wherein the signaling data contains settlement data and further comprising generating and forwarding settlement data records to a settlement unit.

3. The method as recited in claim 1 wherein the checking the access authorization is performed by the interface device associated with one of the plurality of wireless local area networks.

4. The method as recited in claim 3 further comprising:
when the subscriber has not been cleared by the interface means, transmitting at least one individual identification to the external control and managing device:
in response to the transmitting of the individual identification, checking, using the external control and managing device, whether the subscriber has already been granted the authorization to access the TCP/IP network; and
establishing a connection via the TCP/IP network if the subscriber has already been granted the authorization to access the TCP/IP network.

5. The method as recited in claim 4 wherein the at least one individual identification includes at least one of a MAC address and an IP address of the subscriber.

6. The method as recited in claim 4 further comprising:
if no access authorization has yet been granted to the subscriber, prompting the subscriber to enter an authentication data; and
after the subscriber has entered the authentication data, receiving, by the subscriber, the authorization to access the TCP/IP network.

7. The method as recited in claim 3 further comprising checking, using the control and managing device, whether the subscriber is entitled to use at least one of the TCP/IP network and the requested service.

8. The method as recited in claim 1 wherein each of the at least one interface means is associated with a respective one of the at least one wireless local area network, and further comprising storing, in the external control and managing device, at least one of an address of the respective at least one interface means associated with each wireless local area network and an identification and/or an owner of each wireless local area network.

9. The method as recited in claim 8 further comprising storing, in the external control and managing device, an individual website for at least one of the first wireless local area network and the subscriber so that the individual website is capable of being transmitted to the subscriber.

10. The method as recited in claim 9 wherein the subscriber is located in a service area of the first wireless local area network, and further comprising, using the transmitted individual website, logging on, by the subscriber, at the interface means of the first wireless local area network so as to obtain the authorization to access the public TCP/IP network.

11. The method as recited in claim 8 further comprising managing, in the external control and managing device, a table in which the at least one of an address of the interface device associated with the first wireless local area network and an identification and/or an owner of the first wireless local area network is assigned to the subscriber when the authorization has been granted.

12. The method as recited in claim 2 further comprising:
checking whether the subscriber has a credit; and
at least one of severing an established connection and not establishing a connection once the credit has been used up.

13. A system comprising:
a public TCP/IP network;
a plurality of wireless local area networks, each connected via at least one interface device to the public TCP/IP network;
at least one wireless local area network subscriber associated with the public TCP/IP network;
a control and managing device associated with the public TCP/IP network, wherein the control and managing device is external to the plurality of wireless local area networks and a service provider associated with at least one wireless local area network of the plurality of wireless local area networks;
wherein the interface device and the control and managing device each have a data exchange device configured to exchange at least one of signaling and information data via the public TCP/IP network;
at least one of the interface device and the control and managing device has a checking device configured to check, when the at least one wireless local area network subscriber requests the service, an authentication of the subscriber to access the public TCP/IP network; and
the control and managing device further including:
a control device configured to control an establishment of a connection via the public TCP/IP network to the subscriber;
a registration module configured to store a registration of an authorization to access the public TCP/IP network so as to permit movement of the at least one wireless local area network subscriber from a first wireless local area network to a second wireless local area network, free of a renewed authentication check by the checking device, using the stored registration of the at least one wireless local area network subscriber; and
a session observer module configured to monitor capacity usages of the plurality of the wireless local area networks as the subscriber moves from the first to the second wireless local area network; and
a blocking device capable of denying the subscriber the authorization, at least temporarily, to access the TCP/IP network as a function of at least one of the monitored capacity usages.

14. The system as recited in claim 13 wherein the control device is configured to control the establishment of the connection via the public TCP/IP network to the subscriber contingent upon whether the subscriber has the authorization to access the TCP/IP network.

15. The system as recited in claim 13 wherein:
the signaling data includes settlement data;
the control and managing device includes a data generation device configured to generate settlement data records based on the settlement data; and
the control and managing device includes a data forwarding device configured to forward the settlement data records to a settlement unit.

16. The system as recited in claim 13 wherein:
the interface device includes a transmission device configured to transmit at least one individual identification to the control and managing device;
the control and managing device includes the checking device; and
the checking device is configured, in response to the at least one individual identification, to check whether the subscriber has already been granted the authorization to access the public TCP/IP network.

17. The system as recited in claim 16 wherein the at least one individual identification includes at least one of a MAC address and an IP address of the subscriber.

18. A control and managing device comprising:
- a data exchange device configured to exchange at least one of signaling and information data with an interface device of a wireless local area network, the interface device being connected to the data exchange device via a public TCP/IP network;
- a checking device configured to check an authentication of a wireless local area network subscriber to access the public TCP/IP network;
- a registration module configured to store a registration of an authorization of the wireless local area network subscriber to access the public TCP/IP network so as to facilitate movement of the subscriber from a first wireless local area network to a second wireless local area network, free of a renewed authentication check by the checking device, using the stored registration;
- a control device configured to control an establishment of a connection via the public TCP/IP network to the subscriber;
- a monitoring device configured to monitor usages of the first and second wireless local area networks as the subscriber moves from the first to the second wireless local area access network; and
- a blocking device capable of denying the subscriber the authorization, at least temporarily, to access the TCP/IP network based on at least one of the monitored capacity usages,
- wherein the control and managing device is external to the first and second wireless local area networks and a service provider associated with the wireless local area network.

19. The control and managing device as recited in claim 18 wherein the control device is configured to control the establishment of the connection via the public TCP/IP network to the subscriber contingent upon whether the subscriber has the authorization to access the TCP/IP network.

20. The control and managing device as recited in claim 18 wherein further comprising:
- a data generation device configured to generate settlement data records based on the settlement data; and
- a data forwarding device configured to forward the settlement data records to a settlement unit.

21. The control and managing device as recited in claim 18 wherein the checking device is configured, in response to at least one individual identification of the subscriber, to check whether the subscriber has already been granted the authorization to access the public TCP/IP network.

22. The control and managing device as recited in claim 18 further comprising:
- a storage device configured to store at least one of an address of the interface device and an identification and/or an owner of the wireless local area network; and
- a table management device configured to manage a table in which the at least one of the address of the interface device and the identification and/or the owner of the wireless local area network is assigned to the subscriber when the subscriber is logged on to the wireless local area network and the authorization to access the public TCP/IP network has been granted.

* * * * *